United States Patent [19]

Malmberg

[11] Patent Number: 5,556,069
[45] Date of Patent: Sep. 17, 1996

[54] BAIT BUCKET TENDER

[76] Inventor: James A. Malmberg, Tender Products Inc., 4967 Two Mile Rd., Bay City, Mich. 48706

[21] Appl. No.: 161,602

[22] Filed: Dec. 6, 1993

[51] Int. Cl.$^6$ .................................................. A01K 97/00
[52] U.S. Cl. ................... 248/291.1; 43/55; 43/56
[58] Field of Search ........................... 248/291.1, 292.11, 248/311.2, 221.11, 222.11; 43/55, 56; 292/169

[56] References Cited

U.S. PATENT DOCUMENTS

| | | |
|---|---|---|
| 2,119,281 | 5/1936 | Luders, Jr. . |
| 2,487,645 | 11/1949 | Gershon .................................. 43/56 |
| 2,713,843 | 7/1955 | Staley . |
| 2,834,138 | 5/1958 | Pedersen ............................... 43/55 X |
| 2,920,855 | 1/1960 | Giebel .................................... 43/55 X |
| 2,990,642 | 7/1961 | Bloom et al. ............................. 43/55 |
| 3,141,257 | 7/1964 | Stull ........................................ 43/55 |
| 3,220,140 | 11/1965 | Shirley, Sr. .............................. 43/55 |
| 3,586,361 | 6/1971 | Ohno ..................................... 292/169 |
| 3,722,844 | 3/1973 | Baker .................................... 248/302 |
| 3,854,236 | 12/1974 | Goserud .................................. 43/55 |
| 3,938,276 | 2/1976 | Mettler ................................... 43/55 |
| 4,627,189 | 12/1986 | Pippin et al. ............................ 43/55 |
| 4,650,427 | 3/1987 | Huchinson . |
| 4,937,967 | 7/1990 | Wilding .................................. 43/55 |
| 5,163,648 | 11/1992 | Schneider .............................. 248/154 |
| 5,165,198 | 11/1992 | Kilian, III ................................ 43/55 |
| 5,377,945 | 1/1995 | Steinke ................................. 248/292.1 |

Primary Examiner—Ramon O. Ramirez
Assistant Examiner—Derek J. Berger

[57] ABSTRACT

Apparatus for mounting a live fish bucket alongside a fishing boat for movement in a generally vertical plane alongside the boat from a lowered position in which a fish bucket mounted thereon is submerged in water and a stowed, out-of-the-water position adjacent the gunwale. A mounting block is mounted on the gunwale for swingably mounting an elongate frame bar which mounts a live fish bucket and includes a latch for detachably locking the swingable frame bar in the stowed position. The swingable frame bar is of such construction as to keep the bucket from striking the side wall of the boat as the bucket swings between the lowered and stowed positions.

30 Claims, 2 Drawing Sheets

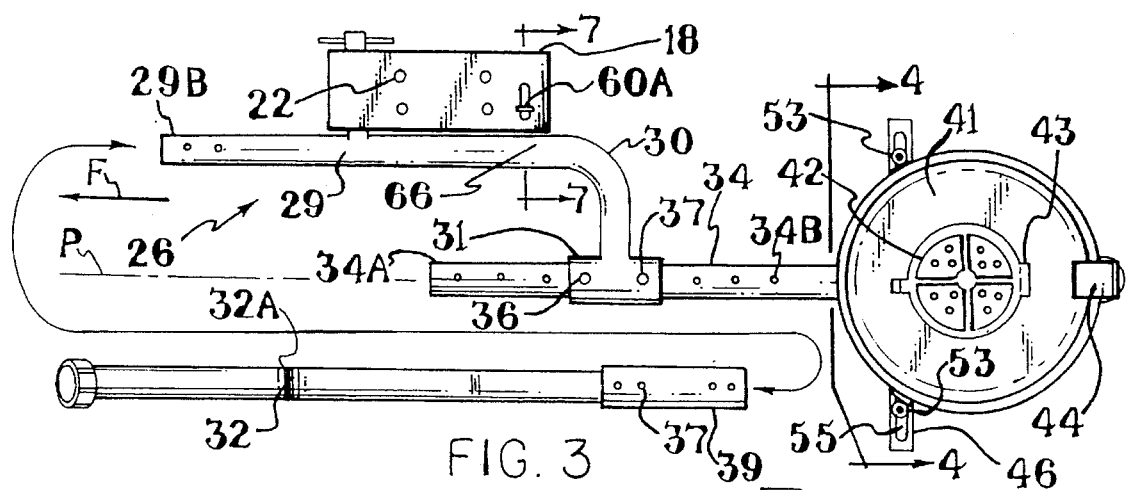
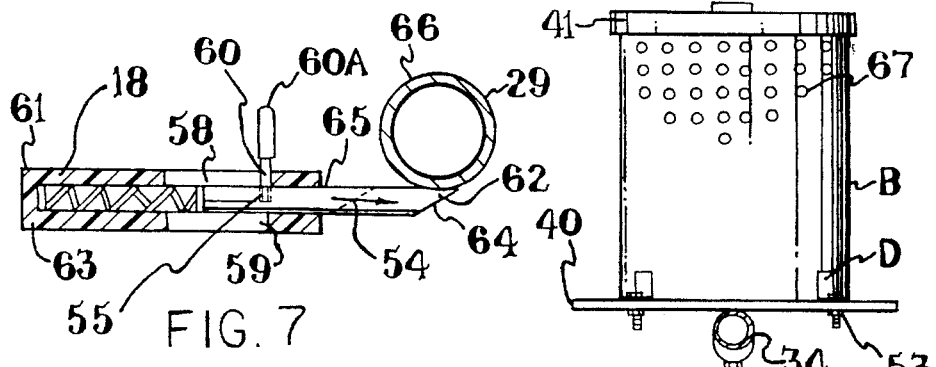
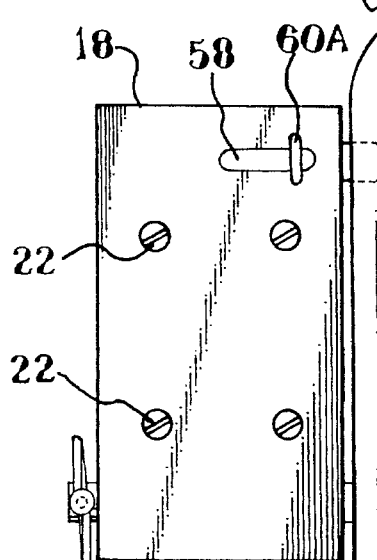
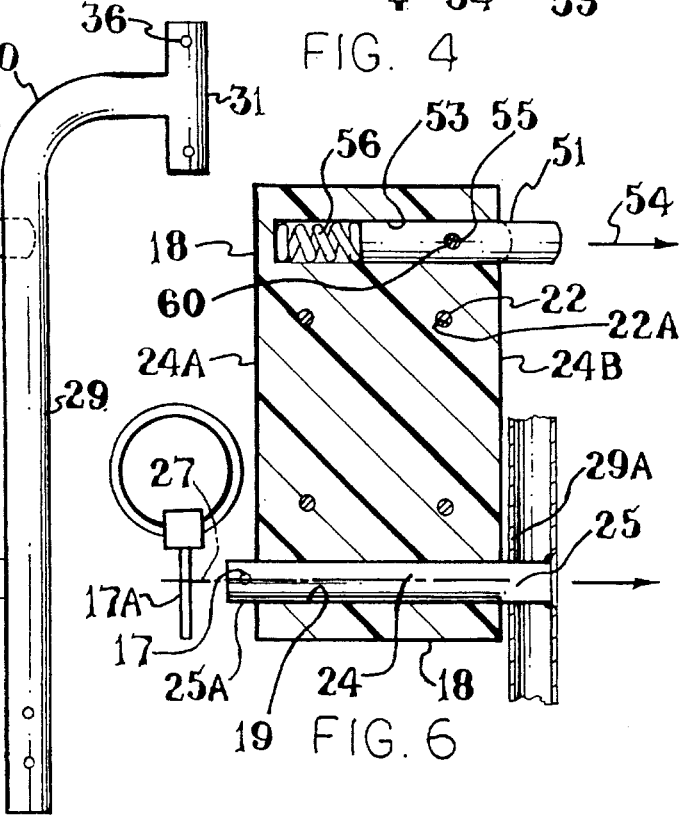

5,556,069

BAIT BUCKET TENDER

BACKGROUND OF THE INVENTION

1. Field of the Invention

This invention relates to apparatus for holding a live fish bucket, such as a minnow bait bucket, and more particularly to apparatus for swingably mounting a bait bucket for movement alongside a boat between a lowered position in which a bait bucket mounted thereon is received in the water and a stowed, out of the water position, adjacent the gunwale of the boat.

2. Description of the Prior Art and Objects

One form of fishing, particularly that of fishing perch in the Great Lakes, utilizes a minnow which is preferably kept alive until the minnow is impaled on a fishing hook. Toward this end, various types of minnow buckets have been provided heretofore with aerators, double walled buckets, and buckets with holes which are coupled to a rope and dropped over-board to be received in the water that is being fished.

When the buckets are retracted from the water to allow the fisherman to extract a minnow from the bucket, the bucket will frequently strike the side of the boat and water, in the minnow pail, will frequently splash inside the boat and the fisherman therein.

Devices have been provided heretofore for holding an immersible minnow receptacle outboard of a boat in such manner as to prevent contact of the minnow bucket and the side of the boat such as that disclosed in U.S. Pat. No. 2,990,642 issued to George E. Bloom on Jul. 4, 1961. This construction does not allow the minnow bucket to be easily moved in a generally vertical plane from a lowered position alongside the boat to a raised position alongside the boat while keeping the minnow bucket away from the side wall of the boat. Accordingly, it is an object of the present invention to provide new and novel apparatus for swingably mounting a live fish bucket on a fishing boat.

It is another object of the present invention to provide apparatus for mounting a live fish bucket on a boat for vertical movement between a lowered position in which the bucket is received in the water alongside the boat and a vertically raised position in which the bait bucket is adjacent the gunwale for easy access to the minnows inside the bucket.

It is a further object of the present invention to provide apparatus for mounting a live bait bucket on a boat for movement between vertically spaced positions alongside the boat but sufficiently laterally spaced from the boat side wall to preclude the bucket from hitting the side wall as it is moved between the vertically spaced positions.

It is a further object of the present invention to provide apparatus for holding a bait bucket in the water away from the boat while providing quick and easy access to a fisherman in the boat to a bait bucket when it is moved out of the water.

It is another object of the present invention to provide apparatus of the type described including apparatus for detachably locking the bait bucket tender in a stowed position adjacent the gunwale of the boat.

It is yet another object of the present invention to provide a sturdy bait bucket tender of the type described which can be easily assembled and disassembled for storage and shipment.

It is another object of the present invention to provide a bait bucket tender of the type described including new and novel structure for securing the bait bucket to the tender and for detachably holding the tender in a raised, out of water position.

Other objects and advantages of the present invention will become apparent to those of ordinary skill in the art as the description thereof proceeds.

SUMMARY OF THE INVENTION

Apparatus for mounting a live fish bucket on a boat gunwale provided on an upstanding boat side wall extending between the bow and stern of a boat, the apparatus comprising: an elongate frame member having a bucket mounting end, a handle end, and a mounting portion intermediate the ends, and pivot mechanism adapted to extend transversely to the boat side wall, swingably mounting the frame member on the gunwale for swinging movement in a generally vertical plane alongside the side wall about a generally horizontal axis between a fish submerging position in which the bucket mounting end is lowered to submerge at least a portion of the fish bucket in water and a fish access position in which the bucket mounting end is raised alongside the gunwale to a raised position to facilitate access to the bucket and any fish therein.

DESCRIPTION OF THE DRAWINGS

The invention may be more readily understood by referring to the accompanying drawings, in which:

FIG. 3 is an enlarged top plan view thereof;

FIG. 4 is a sectional end view, taken along the line 4—4 of FIG. 3;

FIG. 5 is a further enlarged top plan view illustrating only a mounting portion of the structure in FIG. 3;

FIG. 6 is a further enlarged sectional plan view, taken along the line 6—6 of FIG. 2, more particularly illustrating the mounting apparatus attached to the gunwale of the boat; and FIG. 7 is a further enlarged sectional end view, taken along the line 7—7 of FIG. 3.

DESCRIPTION OF PREFERRED EMBODIMENT

Figure 1:
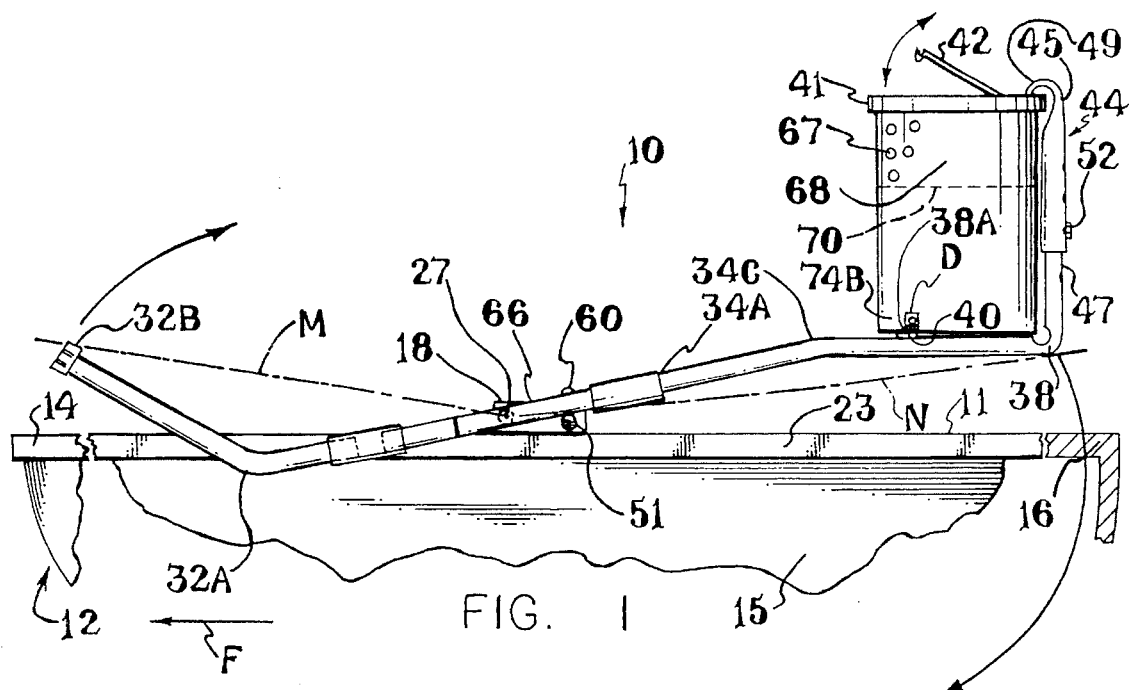
FIG. 1 is a side elevational view of a fishing boat mounting a bait bucket tender constructed according to the present invention illustrated in a stowed out-of-the water position adjacent a boat gunwale.

Apparatus, generally designated 10, constructed according to the present invention is particularly adapted for use in mounting a live fish bucket, such as a minnow bucket B, on the gunwale 11 of a fishing boat, generally designated 12. As usual, the gunwale 11 is integral with, or mounted on, the upper edge of a generally upstanding, longitudinally extending boat side wall 15 which has at least a portion which lies in a generally vertical plane and extends between a bow, generally designated 14, and stern, generally designated 16.

The apparatus 10 comprises a mounting platform or block, generally designated 18, fixed to the gunwale 11 with threaded bolts or screws, generally 22, received in vertical bores 22A, and threaded into the gunwale 11. As illustrated in the drawing, the mounting platform 18 includes upper and lower, vertically spaced parallel mounting surfaces through which the bores 22A vertically extend. As will be more particularly described hereinafter, either the upper or lower mounting surface can abut the gunwale 11, depending on which side of the boat the bait bucket tender 10 is mounted. Journaled in a transverse bore 19 (FIG. 6) provided in platform 18 is a laterally outwardly extending shaft 24 which includes opposite terminal ends 25 and 25A projecting laterally outwardly beyond the lateral edges 24A and 24B of mounting platform 18. The shaft end 25A includes a bore 17 for detachably receiving a ring mounted pin 17A. The shaft end 25 is cantileverly supported laterally outwardly of the laterally outer surface 23 of the gunwale 11 and side wall 15.

A hollow, tubular swing arm or frame bar, generally designated 28, has a midsection 26 fixed to the laterally outer end 25 of the shaft 24. The frame bar 28 may suitably be manufactured with hollow aluminum stock. The mid or intermediate portion 26 includes a hollow tube or sleeve 29, having a sidewall 29A welded or otherwise suitably fixed to shaft end 25. The hollow tube 29 has a laterally outwardly offset, rearward end 30 welded or otherwise suitably fixed to a laterally offset, hollow sleeve 31.

Figure 2:
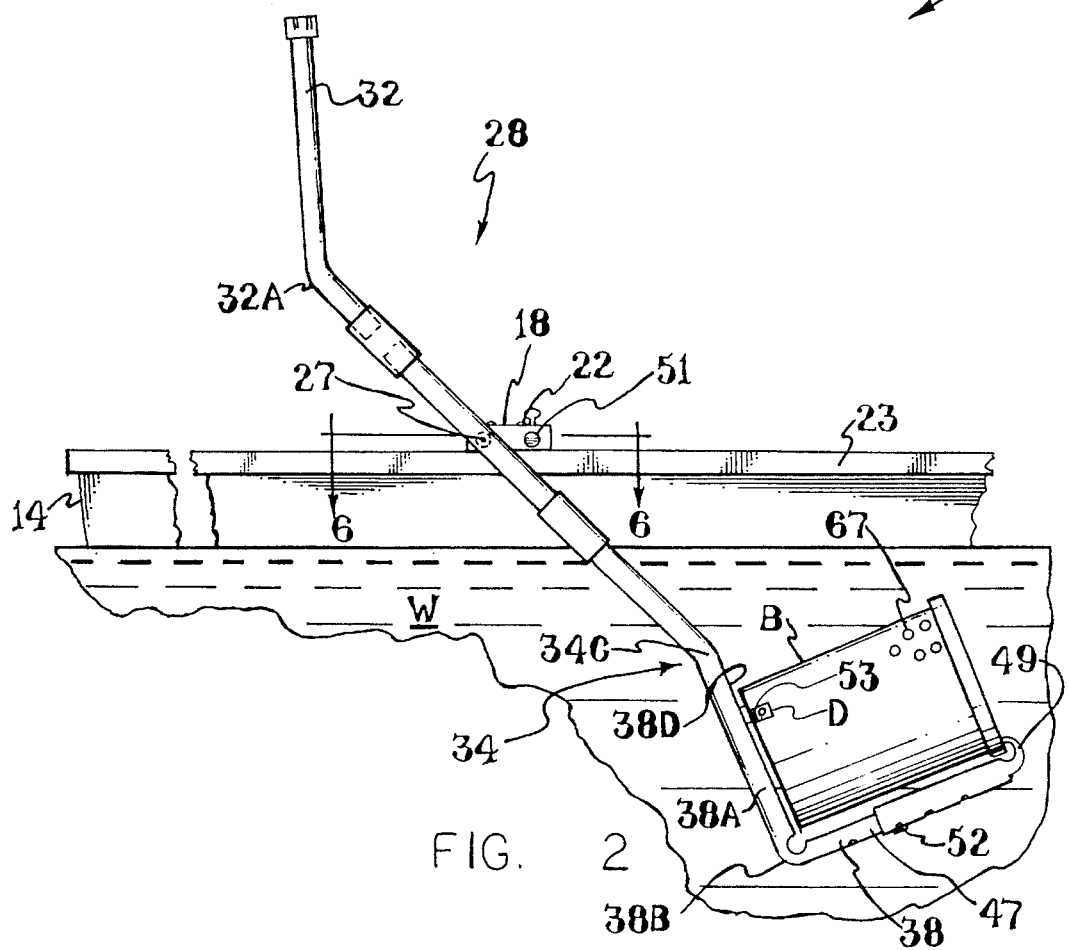
FIG. 2 is a similar side elevational view illustrating the bait bucket tender in a lowered, boat bucket submerging position in the water.

The swing arm 28 also includes a hollow tubular handle 32 detachably telescopingly coupled to a forward end 29B of midsection tube 29 via a telescoping sleeve 39 and pins 37. As illustrated in FIGS. 1 and 2, the handle 32 is bowed upwardly relative to the midsection tube 29 and the swing axis 27. The handle portion 32 includes an elbow 32A which is below a plane M intersecting the rotational axis 27 and the forward terminal end 32B of handle 32.

The frame bar 28 also includes a hollow, tubular, rearward bucket mounting portion 34 which has a forward hollow, tubular end 34A telescopically received within the midsection sleeve 31 and detachably coupled thereto via pins 37 received in apertures 36 provided in sleeve 31 and any selected ones of a plurality of longitudinally spaced apertures 34B provided in tube 34. This adjustment feature allows the bait bucket tender to be utilized on boats having different drafts and still maintain the bait bucket B in the water.

The frame bar 28 is downwardly bowed or curved as illustrated in FIGS. 1 and 2. The rearward bucket mounting portion 34 is laterally outwardly offset relative to the mounting portion 18 so that the bucket mounting portion 34 supports a minnow bucket B laterally outwardly away from the surface 23 as it is being swung from the submerged position illustrated in FIG. 2 and the stowed position illustrated in FIG. 1.

The bucket mounting portion 34 includes an L-shaped, tubular portion 38 which receives the minnow bucket B. The L-shaped tubular portion 38 includes a base leg 38A on which the bottom 74B of the bucket B is supported. The L-shaped tubular portion 38 also has an upstanding rearward post 47 integral with the rearward terminal end 38B of base leg 38A.

The bucket mounting portion 34 includes an intermediate, upwardly bowed elbow 34C which is disposed above a plane N intersecting the rotational axis 27 and the terminal end 38B. A transversely extending minnow bucket support bar 40 is bolted and/or pinned to upper surface 38D of leg 38A and supports a minnow bucket B. A minnow bucket cover 41, of conventional construction is provided and includes an access door 42 hinged at 43 on the cover 41 for allowing the fisherman easy access to the minnows in the bucket B.

A cover clamp, generally designated 44, is provided for holding the lid 41 on the bucket or pail B and includes a tubular section 45 telescopically mounted on the terminal upstanding end post 47 of L-shaped tubular portion 38 and is adjustably vertically secured via a pin 52. The tubular section 45 includes a U-shaped upper terminal end portion 49 which bears against the cover 47 to clamp the bucket B to the support bar 40. To additionally secure the bucket B, L-shaped dogs D are adjustably mounted on the bar 40 via mounting bolts and nuts 53 received in the base of L-shaped dog D and in slots 55 provided at laterally opposite ends of mounting bar 40.

Mounted on the gunwale supported platform 18 is a lock pin, generally designated 51, which is received in a channel or aperture 53 provided in sidewall 24B of platform 18. The pin 51 is yieldably urged laterally outwardly, in the direction of the arrow 54 via, a coiled spring, generally designated 56. Slots 58 and 59 (FIG. 7) are provided in the upper and lower walls 61 and 63 of platform 18 for receiving a manually graspable pin 60 and integral handle 60A so that the pin 51 can be manually laterally inwardly retracted, if desired, against the biassing force of spring 56. The pin 60 is threaded into threaded opening 55 provided in latch pin 51. The pin 60 also sets the maximum laterally outer limit of travel of the pin 51 in the slot or channel 53. the platform 18 may be inverted from the position shown to allow the device to be mounted on the opposite side of the boat. In such case, the pin 60 is removed from slot 58 and inserted through slot 59 and threaded into the opposite end of threaded aperture 51.

The outer end 62 of pin 51 is normally disposed in the path of the frame bar midsection 29. The terminal end 62 includes a cam or beveled portion 64 which will guide along the upper surface 66 of the midsection 29 as the frame bar 28 is being moved to the stowed position in FIG. 1. The beveled portion 64 is inclined upwardly in a laterally outer direction such that the upper surface 66 of the swing bar will bear against the face 64 and wedge to forceably move the block pin 51 laterally inwardly in a direction opposite arrow 54 to a retracted position illustrated in chain lines allowing the bar 28 to swing upwardly to a position above the upper surface 65 of block pin 51. As soon as the bar passes above the pin 51, the coil spring 56 will return laterally outwardly in the direction of the arrow 54 to the position in the path of bar 29 and prevent it from moving downwardly from its stowed position (see FIG. 7).

The bucket B is provided with a plurality of apertures 67 along only the front upper one-quarter and front one-half portion 68 of the bucket B. When the bucket B is in the lowered position, illustrated in FIG. 2, the water will enter the bucket through the apertures 67 to keep the bucket B filled with water. When the bucket B is raised, the water will remain at level 70, just below apertures 67. If the apertures 67 were also provided along the backside of the bucket B and the boat lurched longitudinally, forwardly, in the direction of the arrow F, before the bucket B was removed from the water, the water within the bucket would tend to rush rearwardly out through the apertures in the back of the bucket B.

By placing the apertures 67 only along the forward ½ of the bucket B, if the boat inadvertently moves forwardly before the bucket B can be lifted out of the water, the water within the bucket will remain therein and when the bucket B is subsequently raised to the position illustrated in FIG. 1, the water will seek the appropriate level 70 adequate to maintain a sufficient oxygen supply for the minnows in the bucket.

The bucket holder 34 will swing in a vertical plane P (FIG. 3) parallel to the general overall vertical plane of the boat sidewall 15 and parallel to the longitudinal path F of the boat 12.

THE OPERATION

The user will mount a minnow bucket B on the minnow bucket holder bar 40 and place the clamp 44 downwardly against the upper surface of cover 41 to preclude the cover 41 from being removed from the minnow bucket B. When the fishing site is reached, the user will manually retract the pin 51 via the handle 60A allowing the arm 28 to swing downwardly under the force of gravity until the bucket B is disposed in the water W as illustrated in FIG. 2.

When the user wants to extract minnows from the bucket B, he merely need push downwardly on the handle 32 swinging the bucket B upwardly to the raised position illustrated in FIG. 1. The handle will automatically lock due to the pin 51 being received under the handle portion 30. After a minnow is removed, the user can again retract the handle 60A and the pin 51 to the position illustrated in chain lines in FIG. 7 and allow the arm 28 and bucket B to again swing downwardly to the position illustrated in FIG. 2.

If the user wants to mount the bait bucket B on the opposite side of the boat but still have the bucket disposed rearwardly, the platform 18 can be removed from the gunwale 11. The linch pin 17A is removed from opening 17 and the pivot shaft 24 and swing arm 28 are removed from side 24B of the platform 18. The pin 60 is also removed from the pin 51. The pin 51 is rotated 180° about its axis and the platform 18 is inverted and mounted on the gunwale on the opposite side of the boat 12. The pin 60 is then inserted thru slot 59 and rethreaded into threaded opening 55 in latch pin 51. The midsection 30 of arm 28 is also inverted relative to the handle 32 and bucket mounted end 34. The pin 24 is then reinserted into platform aperture 19 and the linch pin 17A reinserted into opening 17. If desired, separate but identical platforms 18 may be permanently mounted on, or be integrally formed with the gunwale 11.

It should be understood that the term "fish" as used herein includes any and all water creatures which may be used as bait such as shrimp, crayfish, etc.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

What I claim is:

1. Apparatus for mounting a live fish bucket on the hull of a boat which is movable through water in a forward longitudinal path of travel comprising:

a frame bar having a fish bucket mounting portion at one end thereof;

pivot means swingably mounting said frame bar for swinging movement in a to-and-fro path of travel located in a plane generally parallel to the said longitudinal path of travel of said boat; and means on said frame bar for swinging said frame bar between a fish submerging position, in which at least a portion of fish bucket is submerged in water, and a fish access position, in which said fish bucket is raised alongside said boat to a raised position, to facilitate access to any fish located in said fish bucket;

latch means for detachably holding said frame bar in said fish access position;

said latch means being normally disposed in a latching position in the path of said frame bar and including cam means thereon engageable by said frame bar as said frame bar moves from said fish submerging position to said fish access position to laterally inwardly force said latch means to a laterally inwardly retracted position out of said path.

2. The apparatus set forth in claim 1 including yieldable means yieldably urging said latch means to said latching position but allowing movement thereof to said retracted position.

3. Apparatus for mounting a live fish bucket on a boat gunwale provided atop an upstanding boat side wall extending between the bow and stern of a boat, said apparatus comprising:

an elongate frame member having
      a bucket mounting end;
      a handle end;
      a mounting portion intermediate said ends;

pivot means, adapted to extend transversely to said boat sidewall, for swingably mounting said frame member on said gunwale for swinging movement in a generally vertical plane alongside said side wall about a generally horizontal axis between a fish submerging position, in which said bucket mounting end is lowered to submerge at least a portion of said fish bucket in water and a fish access position in which said bucket mounting end is raised alongside said gunwale to a raised position to facilitate access to said bucket and any fish therein; and means on said bucket mounting end for receiving and holding a bucket as said bucket is swung between said fish submerging position and said fish access position.

4. The apparatus set forth in claim 3 wherein stow means is provided for detachably holding said frame member in said fish access position in which said bucket mounting end is raised alongside said gunwale.

5. The apparatus set forth in claim 4 wherein said stow means comprises:

a locking bar;

mount means mounting said locking bar for to-and-fro movement in a path of travel transverse to said frame member; and yieldable means yieldably urging said locking bar to a locking position in the path of said frame member but allowing said locking bar to laterally move to a non-locking position out of said path.

6. The apparatus set forth in claim 5 wherein said mount means includes means cantileverly mounting said locking bar; said locking bar including a terminal end disposed in the path of said frame member in said locking position; said terminal end including a beveled edge engageable by a portion of said frame member as said frame member moves from said fish submerging position to said fish access position.

7. The apparatus set forth in claim 3 wherein said bucket mounting end is disposed laterally outwardly of said pivot means.

8. The apparatus set forth in claim 3 wherein said mounting portion comprises a front elongate portion adapted to be mounted laterally adjacent said side wall and a laterally outwardly offset rearward portion coupled to said elongate portion;

said bucket mounting end including a second elongate forward portion adjustably mounted on said laterally offset portion for movement to any selected one of a plurality of longitudinally spaced positions.

9. The apparatus set forth in claim 8 wherein said offset portion and said second elongate portion include complemental, telescoping portions allowing said bucket mounting end to be moved to any selected one of a plurality of different longitudinally spaced portions relative to said axis; and means for detachably locking said bucket mounting end in any selected one of said longitudinally spaced position.

10. The apparatus set forth in claim 9 including platform means, adapted to be mounted on said gunwale, and laterally extendable and retractable stow means detachably locking said frame bar in said fish access position but releasable to allow said frame bar to lower to said fish submerging position.

11. Apparatus for mounting a live fish bucket on a gunwale of a boat having an upstanding side wall generally located in a generally upstanding plane comprising:

an elongate frame bar having
a handle at one end
fish bucket holder at the opposite end including fish bucket holding means for holding a live fish bucket; and
an intermediate portion between said ends for mounting said frame bar; and pivot means, adapted to extend laterally outwardly of said side wall, pivotally coupled to said intermediate portion for pivotally mounting said frame bar on said gunwale for pivotal movement, in a to-and-fro path of travel located in a plane generally parallel to said plane of said side wall between a fish submerging position in which said fish bucket holding means is lowered to a position in which at least a portion of said fish bucket is submerged in water and a fish access position in which said fish bucket is in a stowed position removed from said water;

said fish bucket holding means including means on said bucket mounting end for receiving and holding a live fish bucket as said bucket is swung between said fish submerging position and said fish access position.

12. The apparatus set forth in claim 11 wherein said fish bucket holder is laterally outwardly offset relative to said intermediate portion and said pivot means.

13. The apparatus set forth in claim 12 including a latch reciprocally moveable on said gunwale between a latching position, in the path of said frame bar, and a non-latching position, out of said path; and yieldable means yieldably urging said latch to said latching position but yieldably allowing movement of said latch to said non-latching position as said frame bar moves from said fish submerging position to said fish access position.

14. The apparatus set forth in claim 11 wherein said handle and said fish bucket holding means are detachably coupled to said intermediate portion.

15. The apparatus set forth in claim 14 wherein said bucket holder is detachably coupled to said intermediate portion for movement to any selected one of a plurality of different longitudinally spaced positions.

16. The apparatus set forth in claim 15 wherein said bucket holder and said intermediate portion include complemental, telescoping parts which allow said bucket holder to longitudinally move relative to said intermediate portion; and means is provided on said telescoping parts for detachably holding said bucket holder in any selected one of said longitudinally adjusted positions.

17. The apparatus set forth in claim 15 wherein said intermediate portion includes an elongate portion coupled to said pivot means and including a rearward, laterally outwardly offset, integral hollow sleeve, said bucket holder including a forward elongate end telescopingly received by said hollow sleeve for movement to any selected one of a plurality of longitudinally spaced position; and means for detachably coupling said forward elongate end of said bucket holder in any selected one of said plurality of longitudinally spaced position.

18. Apparatus for mounting a live fish bucket on a boat gunwale mounted on a boat side wall having laterally inner, inboard and laterally outer, outboard sides so that the fish bucket remains outboard of said outboard side of said boat side wall comprising:

an elongate frame bar adapted to entirely extend outboard of said boat side wall having,
a bucket mounting member at one end including bucket mounting means for mounting a live fish bucket;
a handle at the opposite end; and
a mounting portion intermediate said ends having a laterally inner side and a laterally outer side; and pivot means for extending transversely to said side wall on said laterally inner side of said mounting portion and pivotally mounting said frame bar on said gunwale outboard of said outboard side of said side wall for to-and-fro swinging movement entirely outboard of said outboard side of said side wall about a generally horizontal axis transverse to said side wall;

said bucket mounting member being laterally outwardly offset relative to said mounting portion and said pivot member.

19. The apparatus set forth in claim 18 wherein said handle includes a forward portion which is vertically upwardly offset relative to said mounting portion and said pivot member.

20. The apparatus set forth in claim 19 wherein said one end of said frame bar includes a terminal portion and a portion of said frame bar between said pivot means and said bucket mounting member is vertically bowed such that a portion of said frame bar between said axis and the terminal portion of said frame bar adjacent said bucket holder is at a higher level than a plane extending through the terminal portion of said frame bar and said axis.

21. The apparatus set forth in claim 20 wherein said opposite end includes an opposite terminal portion, a portion of said frame bar between said axis and said opposite terminal portion is vertically downwardly bowed opposite the direction of said bowing between said axis and said terminal end adjacent said bucket holder.

22. The apparatus set forth in claim 18 wherein said bucket holder includes a generally L-shaped member having a base leg for vertically supporting said bucket and an upstanding leg adapted to be rearward of said bucket, a transverse cross bar mounted on said base leg for supporting a lower forward portion of a fish bucket mounted thereon; and bucket restraining means adjustably mounted on said cross bar for movement transverse to said frame bar to any selected one of a plurality of transversely spaced positions; and means for detachably coupling said bucket restraining means to said cross bar.

23. The apparatus set forth in claim 22 wherein said frame bar is substantially rigid.

24. The apparatus set forth in claim 22 wherein said frame bar includes at least one hollow tubular section telescoping receiving another section of said frame bar, and means detachably coupling said sections in any selected one of a plurality of different, longitudinally spaced positions.

25. The apparatus set forth in claim 22 wherein said upstanding leg includes generally U-shaped terminal end frame means for bearing against an upper portion of said fish bucket.

26. The apparatus set forth in claim 25 wherein said fish bucket includes a bait pail and cap means is provided for capping said pail mounted on said bucket holder; said U-shaped, terminal end frame means, detachably holding said cap on said pail resting on said cross bar.

27. The apparatus set forth in claim 26 wherein said leg means includes a lower upstanding post and an upper post vertically adjustably mounted on said lower post and including said U-shaped terminal end frame means; and additional coupling means is provided for detachably coupling said upper and lower posts in any selected one of a plurality of different, vertically spaced positions.

28. The apparatus set forth in claim 18 wherein said pivot means includes a mounting block for mounting on said boat, and a pivot member mounted on one lateral side of said mounting block, said mounting block including first and second vertically spaced, mounting surfaces; a latch pin reciprocally moveable on said mounting block between a latching position, in the path of said frame bar moving in said to-and-fro path, and a non-latching position out of said path.

29. The apparatus set forth in claim 28 wherein manually graspable means is provided and is detachably coupled to said latch pin; and laterally extending slot means is provided in at least one of said vertically spaced surfaces of said mounting means for slidably receiving said manually graspable means.

30. The apparatus set forth in claim 28 wherein laterally disposed aperture means is provided in said block for slidably, reciprocally receiving said, latch pin; and slot means is provided in each of said first and second vertically spaced mounting surfaces in communication with said aperture means; and manually graspable means is coupled to said latch pin and selectively disposed in either selected one of said slot means for manually moving said latch pin.

* * * * *